United States Patent [19]

Kuwabara et al.

[11] Patent Number: 5,561,358
[45] Date of Patent: Oct. 1, 1996

[54] VARIABLE SPEED PUMPING-UP GENERATOR

[75] Inventors: Takao Kuwabara; Masataka Harada, both of Hitachi; Yasuteru Oono; Hiroto Nakagawa, both of Osaka, all of Japan

[73] Assignees: Hitachi, Ltd., Tokyo; The Kansai Electric Power Co., Inc., Osaka, both of Japan

[21] Appl. No.: 360,029

[22] Filed: Dec. 20, 1994

[30]  Foreign Application Priority Data

Dec. 24, 1993 [JP] Japan ................... 5-327916

[51] Int. Cl.⁶ ................... H02K 7/18; H02P 9/04
[52] U.S. Cl. ................... 318/799; 318/723; 318/798; 318/806; 290/40 C; 290/43
[58] Field of Search ................... 318/799, 798, 318/729, 778, 807, 588, 806, 827, 762, 779, 723, 52; 417/22, 36, 53, 27, 45, 40; 290/4 C, 4 R, 4 A, 43, 52, 40 A, 7, 40 C, 54, 40 R; 322/14, 15, 20

[56]  References Cited

U.S. PATENT DOCUMENTS

| | | | |
|---|---|---|---|
| 4,625,125 | 11/1986 | Kuwabara | 290/52 |
| 4,694,189 | 9/1987 | Haraguchi et al. | 290/40 C |
| 4,743,826 | 5/1988 | Bando et al. | 318/762 |
| 4,743,827 | 5/1988 | Shiozaki et al. | 318/798 |
| 4,754,156 | 6/1988 | Shiozaki et al. | 290/52 |
| 4,790,135 | 12/1988 | Noji . | |
| 4,806,781 | 2/1989 | Hochstetter | 290/43 |
| 4,816,696 | 3/1989 | Sakayori et al. | 290/52 |
| 4,823,018 | 4/1989 | Kuwabara et al. | 290/7 |
| 4,920,277 | 4/1990 | Kuwabara et al. | 290/40 |
| 4,980,629 | 12/1990 | Bando et al. | 318/799 |
| 5,090,872 | 2/1992 | Kuwabara et al. | 417/53 |
| 5,148,093 | 9/1992 | Bando et al. | 318/723 |
| 5,160,244 | 11/1992 | Kuwabara et al. | 417/36 |

FOREIGN PATENT DOCUMENTS 57-60645  12/1982  Japan .
62-71497   4/1987  Japan .

*Primary Examiner*—Paul Ip
*Attorney, Agent, or Firm*—Fay, Sharpe, Beall, Fagan, Minnich & McKee

[57]  ABSTRACT

A variable speed pumping up generator includes a first speed control unit for outputting a rotating speed command signal for controlling a pump turbine in accordance with a power output command and outputting an excitation control signal to an AC excitation unit of the generator, and a second speed control unit for controlling, in a generation mode, an amount of AC excitation from an AC excitation unit when a rotating speed of a rotary shaft departs from a lower limit setting or an upper limit setting. The setting is set in accordance with the rotating speed generated during a normal operation.

5 Claims, 9 Drawing Sheets

VARIABLE SPEED PUMPING-UP GENERATOR

BACKGROUND OF THE INVENTION

The present invention relates to a variable or adjustable speed pumping-up generator having a frequency converter as an AC exciting device and having a primary circuit synchronously connected to a commercial power supply system in spite of variable speed rotation of a rotating rotor of a the generator, and more particularly to a variable speed pumping-up generator which controls the speed on the pump turbine side in the generation mode. More specifically, the present invention is to permit stable continuous operation without departing from a predetermined variable speed range.

For the generation mode of a variable speed pumping-up generator for the pump turbine, there are two major control systems depending on whether speed control and output control are assigned to the pump turbine or the prime mover side or assigned to the generator motor or the load side.

In the first control system, the generator motor is assigned for the speed control and the pump turbine is assigned for the output control. It is characterized by:

a. Greater importance is put on the speed control and the speed control waveform is complete.

b. Since the electrical power from the generator motor is almost a duplicate of the mechanical power output from the pump turbine, the affect of the water hammer phenomena upstream and downstream the pump turbine is directly appears on the electrical power from the generator motor and even a trend of back swing appears transiently.

As a result, the resultant adverse affect to the connected commercial power supply system is a problem, and this control system is not recommendable.

Thus, the second control system in which the pump turbine is assigned for an optimum speed control in accordance with an external power command signal, and the generator motor is assigned for a power control to cause the power to directly follow an external power command. It is characterized by:

a. Rapid and straight-forward power response which is very close to the power command is expected.

b. Since the speed control is conducted on the prime mover side, safety is higher than that in a system in which the speed control is conducted on the generator motor side, or the load side.

In this system, even if a rapid power change command is given, the adverse affect from the water hammer phenomena does not appear on the commercial power supply system at all.

However, since the speed control depends on the flow rate control of the pump turbine which has a slow response, the speed tends to respond too slowly or to allow overshooting to some extent.

On the other hand, it is inoperative for the adjustable speed machine to control speed strictly within the predetermined speed range because otherwise the frequency converter lose its function.

Further, in the adjustable speed pumping-up generator, an operating speed range in the turbine mode or the generation mode of the adjustable speed pump turbine is, usually, limited to a lower area of the adjustable speed range while an operating speed range in the pumping-up mode is over the substantially entire range. This is due to the consideration of the fact that the turbine efficiency is higher at a lower rotating speed than the synchronous speed and an input adjustable range in the pumping up mode should be as large as possible.

Thus, in the adjustable speed pumping-up generator, when the rotating speed of the pump turbine overshoots beyond a lower limit by a predetermined amount or beyond an upper limit by a predetermined amount in the generation mode, a backup speed control by adjusting electrical power output of the adjustable speed generator motor comes in service to suppress the overshoot as disclosed in Japanese Patent publication (Kokai) No. JP-A-62-071497.

FIG. 6 shows the system of JP-A-62-071497. An induction motor 1 is rotated by a water turbine 2 directly connected to a rotor thereof, and an AC exciting current controlled to a predetermined phase in accordance with a rotating speed of the induction motor 1 by a secondary exciting control unit 3 having a frequency converter is supplied to a secondary winding 1b of the induction motor 1, and adjustable speed operation is conducted such that an AC power having the same frequency as that of an AC system 4 is outputted from a primary winding 1a of the induction motor 1. A power for controlling the secondary exciting control unit is supplied by a receiving transformer 12.

A function generator 5 receives an external generation output command Po and a water level detection signal H to generate an optimum rotating speed command Na and a feed-forward signal Ya for improving response speed of the guide vanes. When a variation of water level is small, the water level signal H may be omitted. A rotating speed control unit 16 compares an actual rotating speed N detected by a rotating speed detector 6 with the optimum rotating speed command Na to output a guide vane opening control signal $\Delta Y$. The feed-forward signal Ya from the function generator 5 and the guide vane opening control signal $\Delta Y$ are summed by an adder 21 and a sum is inputted to a guide vane drive unit 10 which controls the guide vanes 11.

A slip phase detector 7 detects a slip phase Sp which is equal to a difference between a potential phase of the AC power supply system 4 and a secondary rotating phase of the induction motor represented by an electrical angle. A configuration of the slip phase detector 7 is explained. A rotor of the slip phase detector has a three-phase winding connected in parallel to the primary winding 1a of the induction motor 1, and Hall converters are arranged on a stator of the slip phase detector 7 at positions spaced by $\pi/2$ electrical angle so that signals having matched voltage phase of the AC system 4 as viewed from the secondary of the induction motor 1 are outputted from the Hall converters and converted to the slip phase Sp, which is inputted to the secondary exciting control unit 3. The rotating speed N detected by the rotating speed detector 6 is inputted to a generation output correction command unit 25, and an output $\Delta P2$ therefrom and the external generation output command Po are summed by an adder 26 which produces an induction motor output command $P_G$ which in turn is inputted to the secondary exciting control unit 3.

A configuration of the generation output correction command unit 25 is explained. When the rotating speed is between settings N2 and N3, the generation output correction command signal $\Delta P2$ is kept at zero, and when the rotating speed N is lower than the setting N2, the generation output correction command signal $\Delta P2$ is decreased in proportion to the decrease of the rotating speed N. On the other hand, when the rotating speed N is higher than the setting N3, the generation output correction command signal $\Delta P2$ is increased in proportion to the increase of the rotation speed N. An absolute value of the generation output correction command signal ΔP2 is controlled not to exceed P2. The settings N2 and N3 are set in accordance with a voltage rating and a frequency output range of the frequency converter of the secondary exciting control unit 3 and a rotating speed range determined by performance characteristics of the turbine 2.

The induction motor output command PG and the slip phase Sp of the slip phase detector 7 are inputted to the secondary exciting control unit 3 and an AC exciting current supplied to the secondary winding 1b of the induction motor 1 is controlled such that the output detection signal P of the induction motor 1 detected by effective power detector 9 is equal to the induction motor output command PG. More particularly, the control method disclosed in Japanese Patent publication (Kokoku) No. JP-B-57-60645 may be applied. The guide vane drive unit 10 controls the guide vane 11 in accordance with a sum of the feed-forward signal Ya and the guide vane opening control signal ΔY to control the water turbine output PT.

A response when the generation output Po is increased stepwise as shown in FIG. 7(a) to increase the generation output P stepwise when the rotating speed N is around the setting N2 at a time t0 is explained. When the generation output Po is increased stepwise at the time t0 as shown in FIG. 7(a) to increase the generation output P stepwise, the generation output P of the induction motor 1 follows the change of the generation output command Po and is increased as shown in FIG. 7(g). On the other hand, the response of the opening Y of the guide vanes 11 to the sum of Ya and ΔY which is mechanically conducted is slower than the response of the generation output P to the generation output command Po. As a result, the water turbine output PT is lower than the generation output P and the rotating speed N is temporarily decreased after the abrupt change of the generation output command Po, and thereafter at a time t1, the generation output P and the water turbine output PT become equal and decreasing of the rotating speed N causes to record a transient minimum value. At the time t1, since the speed error ΔN is positive, the guide vane opening control signal ΔY is positive and the guide vane opening Y continues to increase. Accordingly, the water turbine output PT becomes larger than the generation output P and the rotating speed N starts to rise as shown in FIG. 7(f). As the rotating speed N increases, the error from the optimum rotating speed command Na decreases, and as the guide vane opening control signal ΔY decreases, the difference between the water turbine output PT and the generation output P decreases and the acceleration of the rotating speed N decreases.

If the rotating speed N falls below the setting N2 during the decrease of the rotating speed N after the abrupt increase of the generation output command Po, the following occurs. When the rotating speed N decreases below the setting N2, the induction motor output command PG inputted to the secondary exciting control unit 3 is smaller as much as the generation output correction command signal ΔP2 than the external generation output command Po. As a result, the time t1 at which the water turbine output PT becomes equal to the generation output P occurs earlier than the time t2 at which the water turbine output PT becomes equal to the generation output command Po, and the time point at which the rotating speed N record a transient minimum shifts from the time t2 to the time t1 as shown by a broken line in FIG. 9(f) so that a transient overshoot of the rotating speed N is materially reduced. Thus, the backup speed control is conducted such that the rotating speed of the adjustable speed water turbine generator does not lower beyond the predetermined setting value. A similar phenomenon occurs when the upper limit setting N3 is exceeded.

However, the prior art does not teach where the backup speed control through the secondary exciting control unit 3 is to be effected, that is, how the lower limit setting N2 and the upper limit setting N3 are to be set.

Further, it has been proved that the above prior art system is not applicable when the operation speed range in the generation mode is limited to the lower area in the adjustable speed range and a difference between the upper limit of the operation range in the generation mode and the upper limit of the operation range in the pumping up mode is large. Namely, when the backup speed control is set slightly below the lower limit of the generation mode adjustable speed range and slightly above the upper limit of the pumping up mode adjustable speed range, the rotating speed N transiently exceeds the generation mode variable speed range upper limit significantly immediately after the abrupt decrease of the power command Po during the operation near the 100% output in the generation mode. Namely, the suppression effect of the overshoot by the backup control is not available until the rotating speed N reaches its upper limit setting and substantial speed excursion occurs in the adjustable speed range. Even if the upward excursion of the rotating speed N is allowable, because it is still within the adjustable speed range for the frequency converter or it can be easily suppressed by the backup speed control at the upper limit of the adjustable speed range, if the power command decreases abruptly subsequent to the upward excursion and accordingly the rotating speed command also decreases abruptly, the rotating speed rapidly decreases by coincidence of a swing-back of the upward excursion. Consequently an overshoot occurs below the lower limit of the adjustable speed range. It may step into the lower backup speed control range until the suppression effect increases to a extent to overcome the downward overshoot energy. The amount of step-in may be so large that the synchronization is lost.

SUMMARY OF THE INVENTION

It is an object of the present invention to control an adjustable speed pumping up generator which effects the speed control by the pump turbine in the generation mode such that it does not depart from a predetermined adjustable speed range by overshoots and, accordingly, permits stable and continuous operation.

The above object is achieved by an adjustable speed pumping up generator including an induction generator motor having a primary winding connected to a power system and a secondary winding, and an AC exciting unit for AC exciting said secondary winding, a rotary shaft of said AC exciting unit being rotated in a generation mode by a pump turbine connected thereto and rotating said pump turbine in a pumping up mode, comprising:

first speed control means for outputting a rotating speed command signal, in the generation mode, for controlling said pump turbine in accordance with a power output command and outputting an AC exciting control signal to said AC exciting control unit; and second speed control means for controlling, in the generation mode, an amount of AC excitation from said AC exciting unit when the rotating speed of said rotary shaft falls below a lower limit setting;

a distance between the lower limit setting and a lower limit of a normal rotating speed adjustable range of said shaft being set to be larger than at least one half of a peak-to-peak amplitude of possible sustained speed oscillation, say, 0.15 percent of the rated speed which corresponds to no slippage or zero excitation frequency in a case where sustained speed oscillation is expected to be.

The above object is further achieved by a adjustable speed pumping up generator including an induction generator motor having a primary winding connected to a power system and a secondary winding, and an AC exciting unit for AC exciting said secondary winding, a rotary shaft of said induction generator motor being rotated in a generation mode by a pump turbine connected thereto and rotating said pump turbine in a pumping up mode, comprising:

first speed control means for outputting a rotating speed command signal, in the generation mode, for controlling said pump turbine in accordance with a power output command and outputting an AC exciting control signal to said AC exciting control unit; and second speed control means for controlling, in the generation mode, an amount of AC excitation from said AC exciting unit when the rotating speed of said rotary shaft rises above an upper limit commencement setting;

the upper limit commencement setting being higher than a maximum value of a normal adjustable speed range in the generation mode and lower than an upper limit of the normal adjustable speed range in the pumping up mode.

The above object of the present invention may also be achieved in the adjustable speed pumping up generator by selectively using the two control systems described above for the control of the apparatus in the generation mode.

In the adjustable speed pumping up generator of the present invention, in the generation mode, the speed control command is applied to the pump turbine which is a prime mover to conduct normal speed control, and the speed control command in the generation mode is adjustably set by the first speed control means in accordance with the operation state. When the rotating speed of the pump turbine falls below the minimum value of the normal operation adjustable speed range by the predetermined amount at the transient change of the output command change in the generation mode, the second speed control means is activated to control the output of the AC exciting unit to backup control the speed so that any departure of the speed from the predetermined range as per capacity of said AC exciting unit is prevented. In this case, the lower limit commencement setting at which the backup speed control is commenced slightly below the minimum value of the normal operation adjustable speed range by the backup speed control command unit is set such that a difference between the setting and the minimum value of normal operation range in the generation mode is larger than one half of peak-to-peak amplitude of possibly sustained speed oscillation which is continuously generated thereafter or anticipated to be generated thereafter under the normal operation without backup from the backup speed control. Thus, when the change in the generation output command is small, the backup speed control remains out of operation, and for the sustained speed oscillation which is continuously generated by the characteristic of the normal speed control only by the water turbine or speed oscillation remaining as a wake of a transient, the backup speed control is no longer in service so that resultant direct disturbance of the backup speed control to the electrical power output from the generator is avoided.

Further, in the adjustable speed pumping up generator of the present invention, in the generation mode, the speed control command is applied to the pump turbine which is a prime mover to conduct normal speed control, and the speed control command in the generation mode is adjustably set by the speed control means in accordance with the operation state and the maximum value of the normal operation speed range in the generation mode is set to be lower than the maximum value of the normal operation speed range of the pumping up mode. In addition, the upper limit commencement setting for the backup speed control is set to be higher than the maximum value of the normal operation speed range of the generation mode and lower than the maximum value of the normal operation speed range of the pumping up mode. By setting the upper limit commencement setting of the backup speed control to the vicinity of the maximum value of the normal operation speed range, the temporary overshoot width of the rotating speed can be suppressed as low as desired.

DESCRIPTION OF THE PREFERRED EMBODIMENTS

Figure 1:
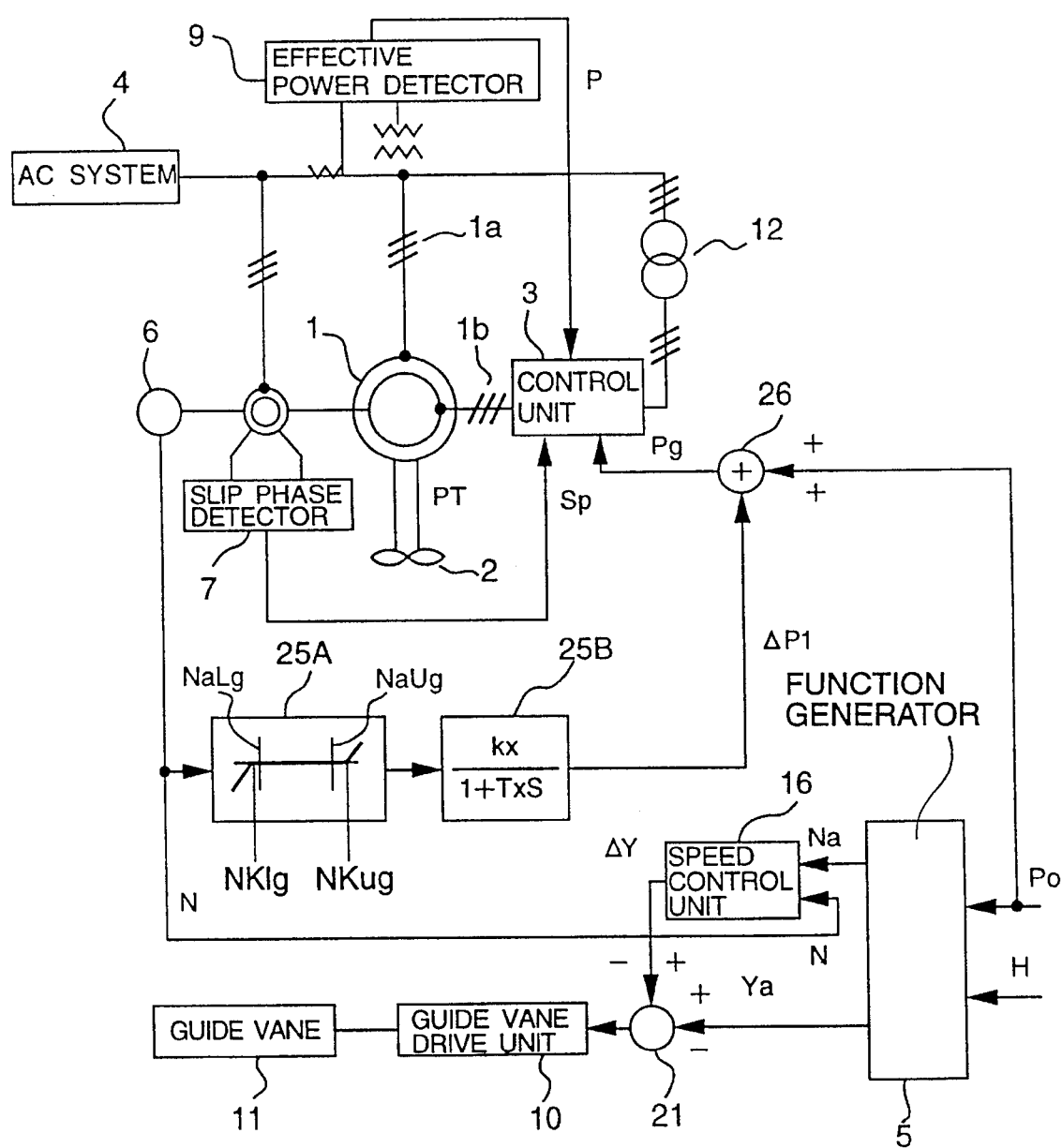
FIG. 1 shows a configuration of one embodiment of a variable speed pumping up generator of the present invention.
Figure 6:
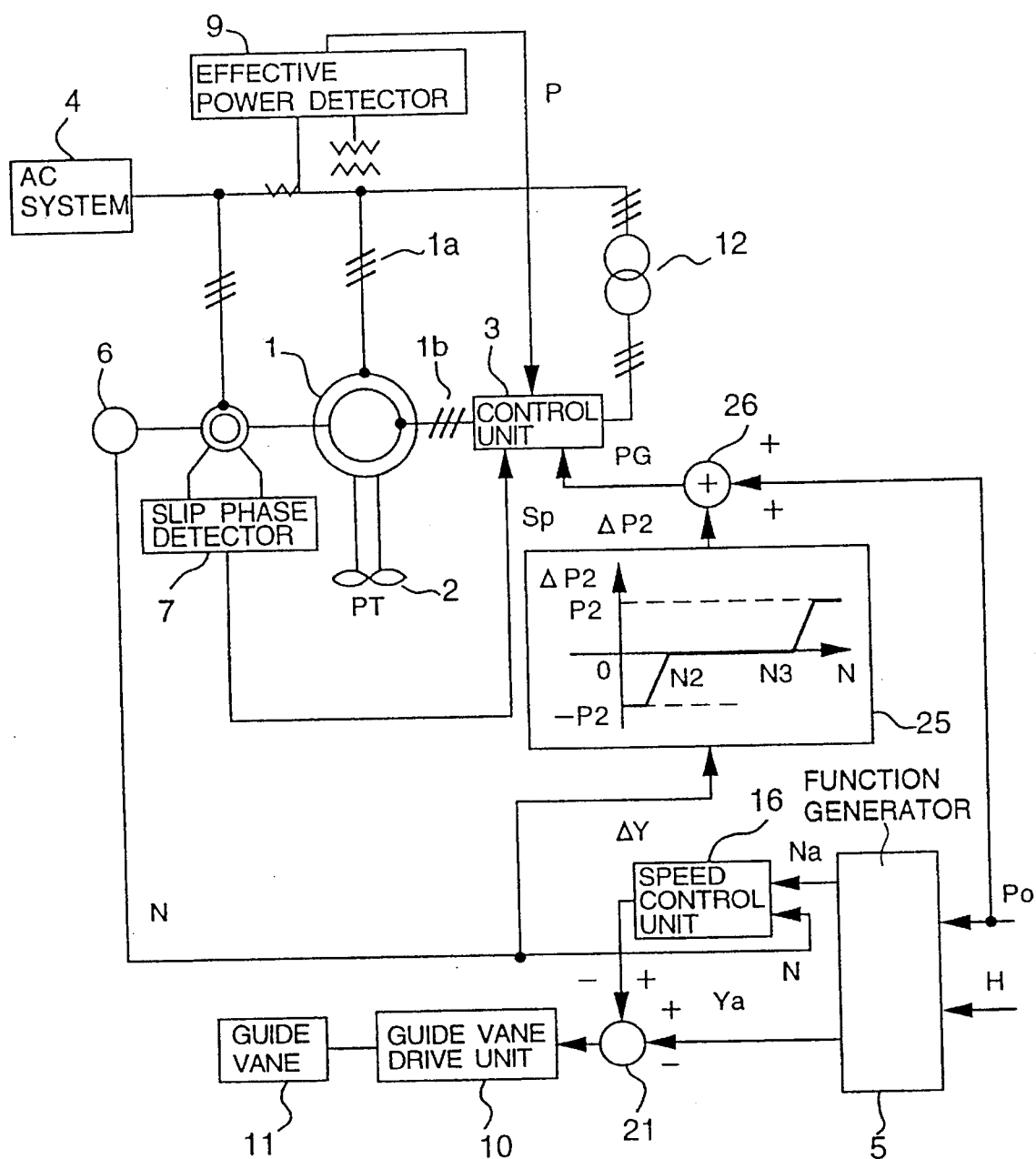
FIG. 6 shows a configuration of a prior art variable speed pumping up generator.
Figure 7:
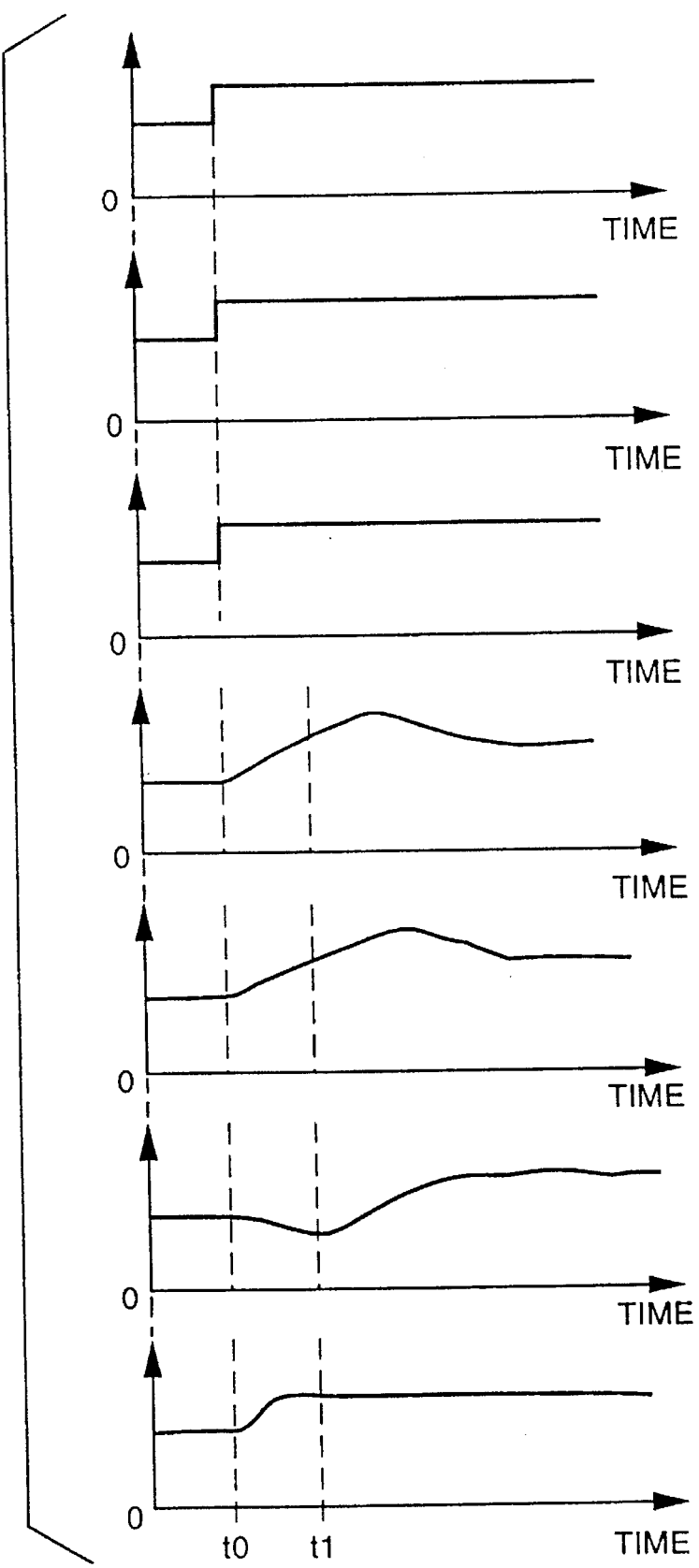
FIG. 7 illustrates a lower limit control in the prior art.

One embodiment of the present invention is now explained with reference to the drawings. FIG. 1 shows an embodiment of the present invention in which the like numerals to those used in FIG. 6 designate the like or corresponding elements. Different portions in FIG. 1 from FIG. 6 are now explained. Numeral 25A corresponds to the generation output correction command unit 25 of FIG. 6. When the rotating speed N is between the settings Nklg and Nkug, the output signal is kept at zero, and when the rotating speed N falls below the setting Nklg, the output signal is decreased in proportion to the decrease of the rotating speed N. On the other hand, when the rotating speed N rises above the setting Nkug, the output signal is increased in proportion to the rise of the rotating speed N and the backup speed control operation is started. The settings Nklg and Nkug are determined in the following manner.

Assuming that the lower limit of the optimum rotating speed command Na in the generation mode is Nalg and the upper limit thereof is Naug, that is, the adjustable speed operation range by the normal pump turbine speed control in the generation mode is Nalg~Naug (normal operation range), they are set to meet:

Nklg<Nalg, Nkug>Naug

Namely, they are set outside of the normal adjustable speed operation range. Further, (Nalg–Nklg) is set to be larger than a single amplitude of a continuous rotation fluctuation which possibly occurs in the steady state. This is due to the consideration that the backup speed control conducted through the secondary exciting control unit 3 does not interfere with the speed control by the turbine output control even if the optimum rotation speed command Nag is at the lower limit and the stable continuous operation is attained.

Figure 3A:
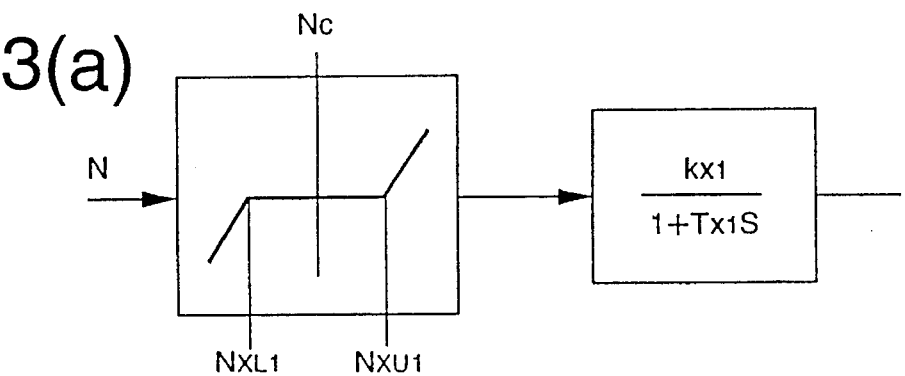
FIG. 3 illustrates an operation of a portion of the embodiment of the present invention.
Figure 3B:
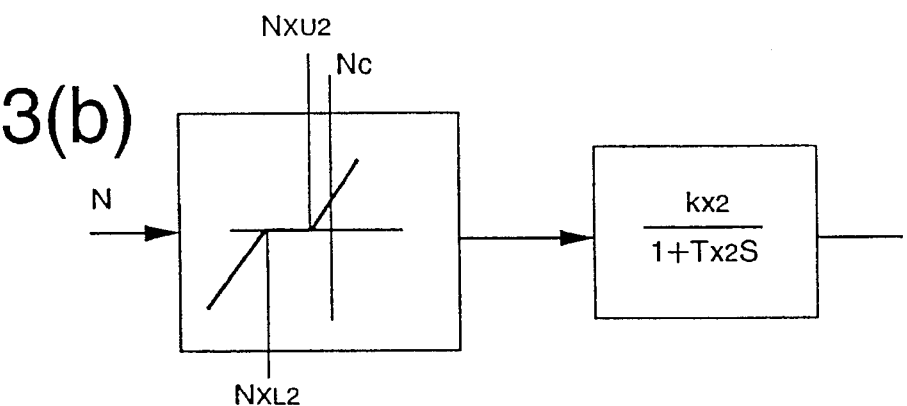
Figure 3C:
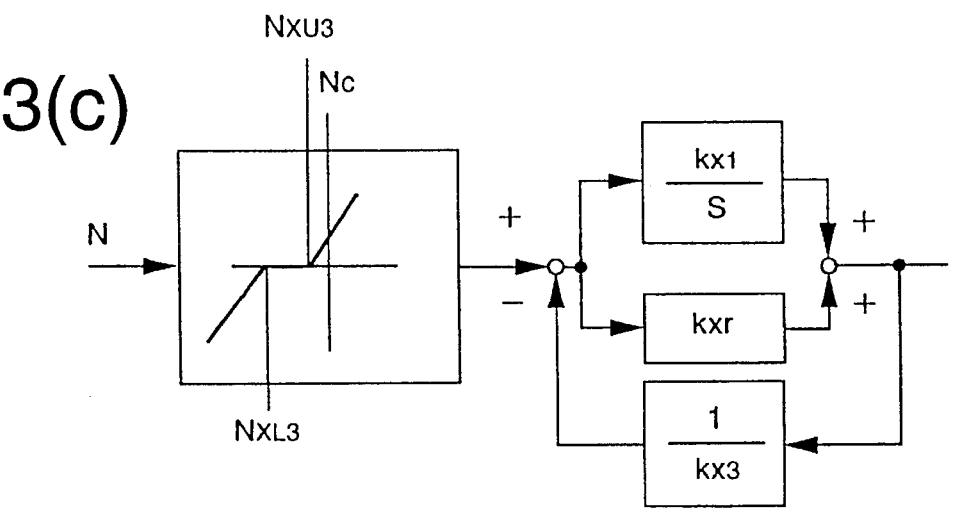

FIG. 3 shows an embodiment of a transient characteristic control unit 25B which controls the response and the stability of the backup speed control unit through the secondary exciting control unit 3. FIG. 1 shows an example of a primary delay element (as FIGS. 3(*a*) and 3(*b*) do) although it may be replaced by a PI operator as shown in FIG. 3(*c*) in which s represents a Laplace operator. Numeral 26 denotes an adder which sums the output ΔPI of the transient characteristic control unit 25B and the externally applied generation output command Po to produce the induction motor output command PG.

Figure 8:
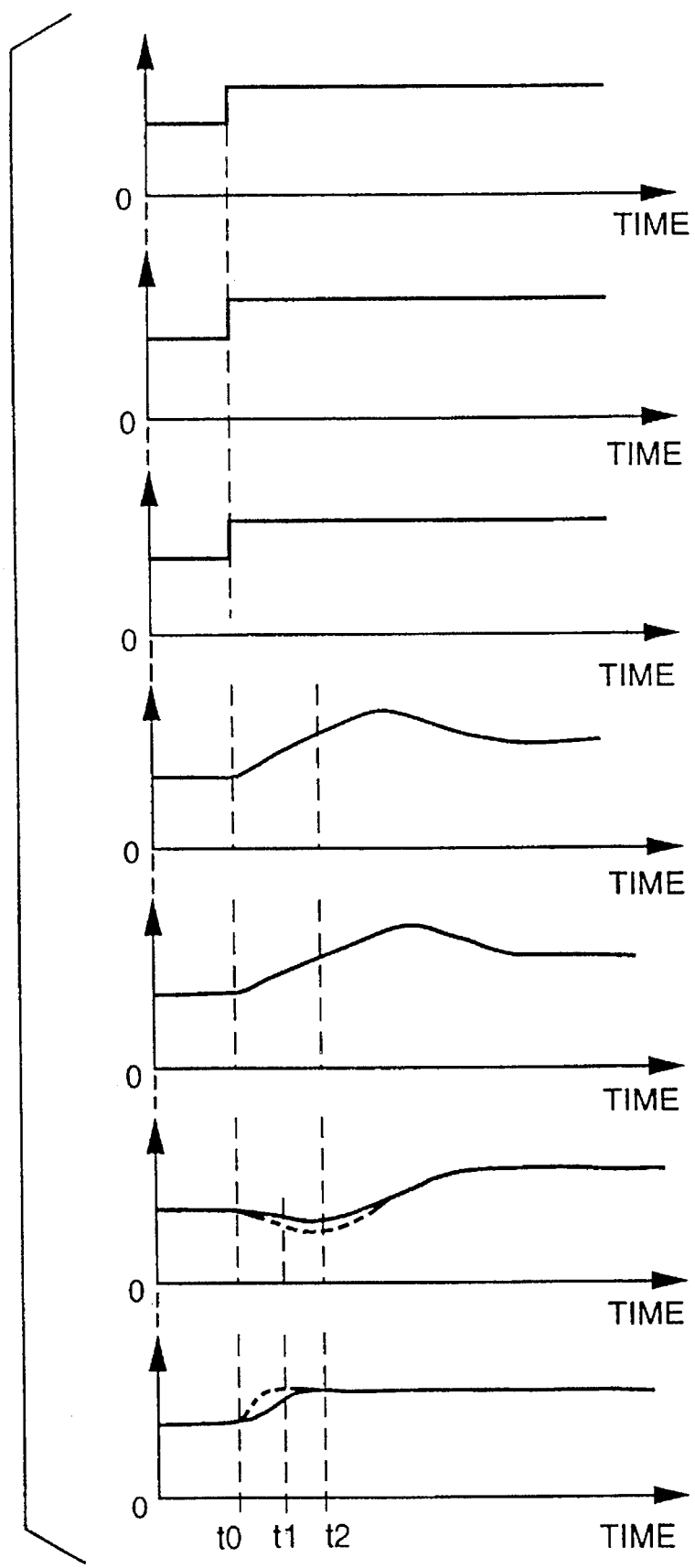
FIG. 8 illustrates the lower limit control in the prior art.
Figure 9:
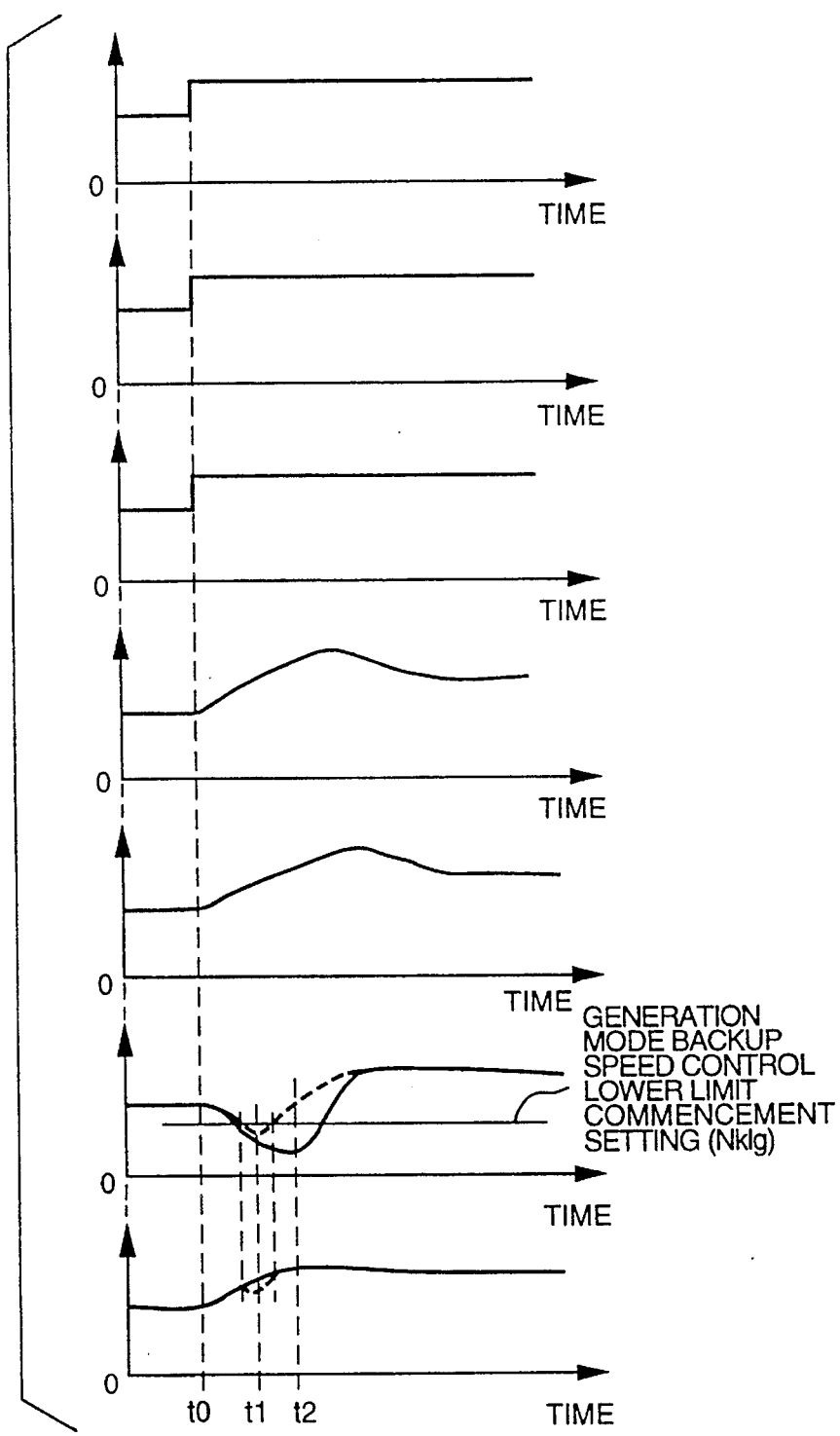
FIG. 9 illustrates the lower limit control in the embodiment of the present invention.

In the control unit of the present embodiment, a response when the generation output command Po is increased stepwise at time t0 as shown in FIG. 9(*a*) in order to increase the generation output P stepwise when the rotating speed N is around the lower setting Nalg of the normal operation range is explained. When the generation output command Po is increased at the time t0, the rotating speed N temporarily decreases as shown in FIG. 9(*f*) as opposed to the change of the optimum rotating speed command Na as it does in FIG. 8. When the rotating speed N becomes lower than the lower limit setting Nklg of the backup speed control, the induction motor output command inputted to the secondary exciting control unit 3 by the generation output correction command signal ΔPI becomes smaller than the external generation output command Po. Accordingly, the time t1 at which the turbine output PT corresponds to the generation output is earlier than the time t2 at which the turbine output PT corresponds to the generation output command Po. Accordingly, in accordance with the present invention, the time at which the rotating speed N is minimum shifts from the time t2 to the time t1 as shown by a broken line in FIG. 9(*f*). Further, the transient back overshoot can also be reduced materially.

In accordance with the present invention, since the predetermined difference is given between the lower limit Nalg of the normal operation range of the optimum rotating speed command Na and the lower limit setting Nklg of the backup speed control, the backup speed control is not effective when the change of the generation output command Po is small. In addition, in the speed control by the turbine, it is unavoidable that certain continuous rotation vibration occurs even in the steady state due to a non-sensitive band and a non-movable band present in the rotating speed control unit 16, a hysteresis and a response delay in the output characteristic of the turbine itself. In the present invention, as described above, the difference (αG in FIG. 2) between the lower limit Nalg of the normal operation range of the optimum rotating speed command Na and the lower limit Nklg of the backup speed control is set to be larger than a half of a peak-to-peak amplitude of the continuous rotation vibration. And, in the steady state, the backup speed control is made ineffective.

Figure 2:
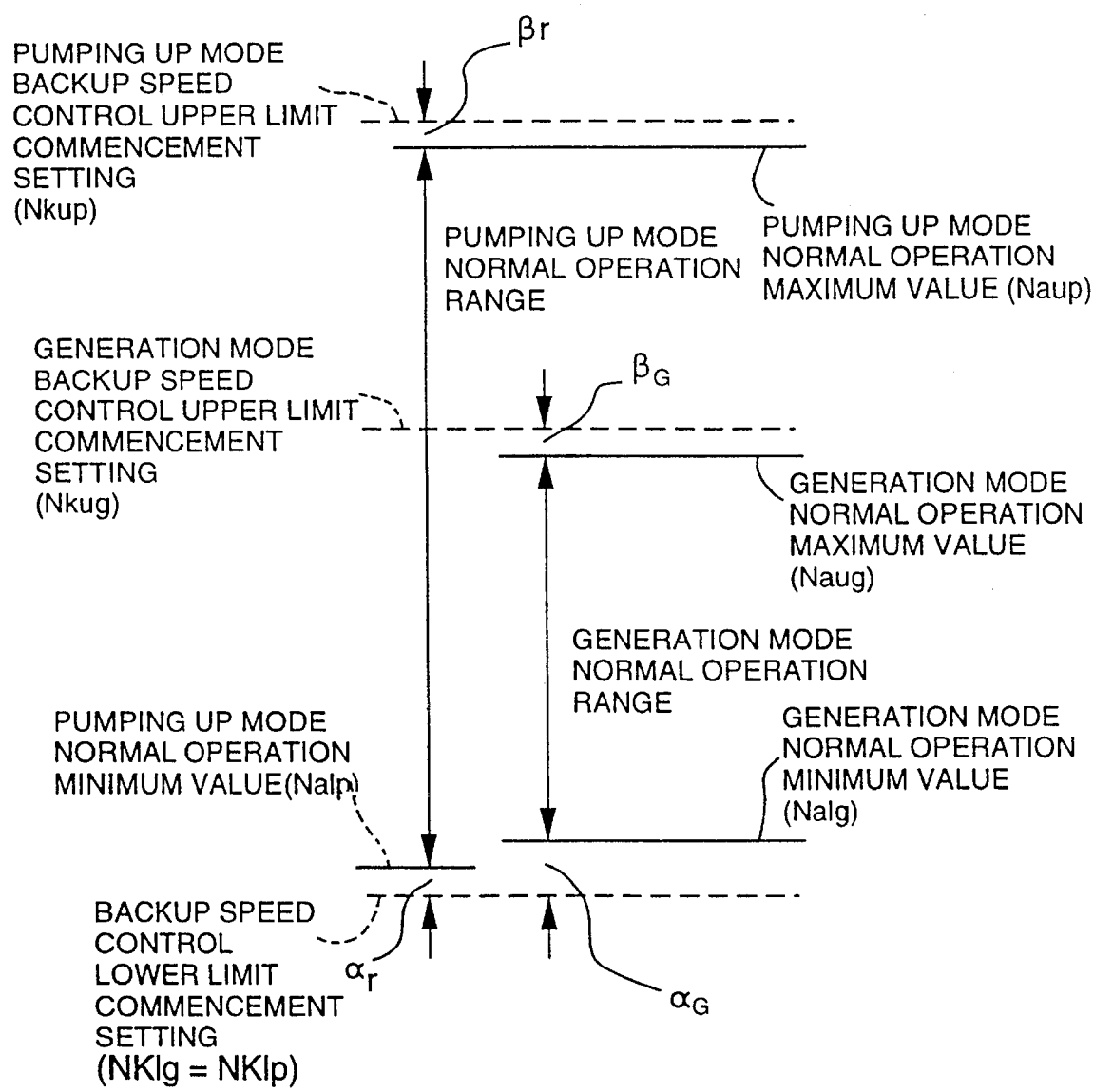
FIG. 2 illustrates a normal operation range in the embodiment of the present invention.

Referring to FIG. 2, the upper limit control of the operation state is explained. In the adjustable speed pumping up generator, it is a common practice to set the adjustable range of the rotating speed, that is, the normal operation range as large as is permitted by the frequency converter so that the adjustable range of the input is as large as possible. In FIG. 2, the lower limit Nalp to the upper limit Naup of the normal operation range in the pumping up mode corresponds to it. On the other hand, in the generation mode, it is common that the normal operation range is narrow as shown in FIG. 2 because the rotating speed which assures the maximum efficiency is lower than that in the pumping up mode. Particularly, the adjustable speed upper limit Naug of the normal operation range is, in many cases, lower than the upper limit Naup in the pumping up mode.

Accordingly, the next problem to be solved is where the upper limit setting of the backup speed control through the secondary exciting control unit 3 is to be set, particularly where the upper limit setting Nkug in the generation mode is to be set. In the present invention, it is set to be lower than Naup and higher than Naug as shown in FIG. 2. Further, it is set such that a difference βG from the upper limit Naug of the normal operation range in the generation mode is not too large. It is never shared with the upper limit setting Nkup of the backup speed control in the pumping up mode.

Figure 4:
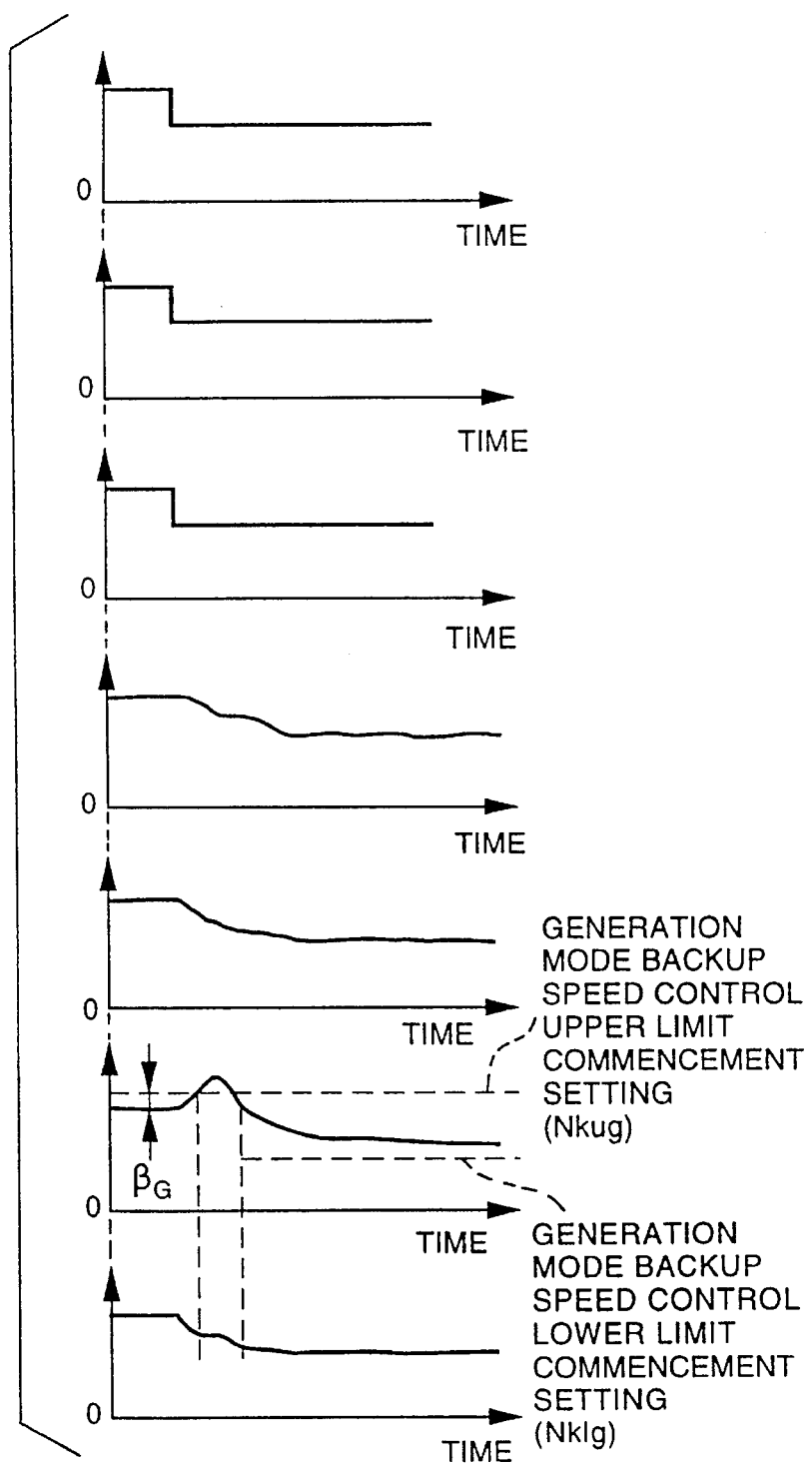
FIG. 4 illustrates an upper limit control in the embodiment of the present invention.
Figure 5:
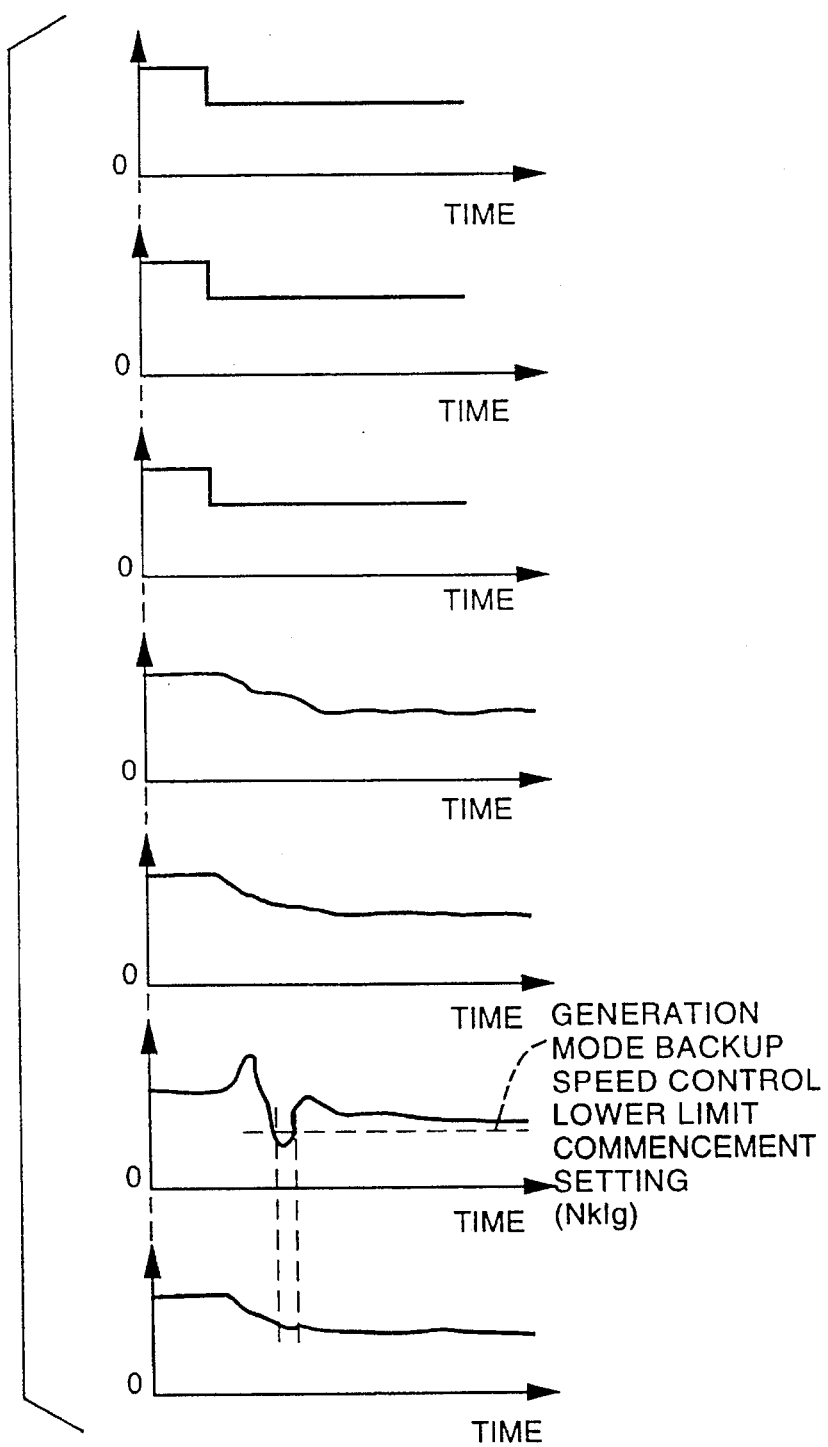
FIG. 5 illustrates the upper limit control in the embodiment of the present invention.

Referring to FIGS. 4 and 5, an operation of the apparatus of the present invention is now explained.

In FIG. 5, βG is too large. When the generation output command Po abruptly decreases as shown, the rotating speed N temporarily rises as shown in FIG. 5(*f*) because the response of the generation output P is faster than that of the turbine output PT (rather it is set faster so that the feature of the adjustable speed apparatus is brought). Then it swings back largely and drops violently. The larger the amplitude of the previous temporary rise is, the larger is the strength of the swing-back drop. Thus, the rotating speed N drops below the lower limit Nalg of the normal operation range and further tends to drop below the lower setting Nklg of the backup speed control. When it reached the lower limit setting Nklg, the backup speed control becomes effective through the secondary exciting control unit 3 to apply the brake, but the rotation is not stopped immediately but overruns to some extent. The amount of overrun relates to the width of the temporary rise of the rotating speed immediately after the start of the drop of the generation output command Po. If a large value is permitted to the latter, the former is also large. In other words, when the rotating speed command Po is abruptly decreased immediately after the overshoot, the rotating speed command Po and the overshoot swing-back overlap and the overrun is too large. As the overrun becomes too large, the operation range of the secondary exciting control unit 3 is departed and the function is disordered.

In this manner, the overshoot in the lower limit of the adjustable speed range deeply relates to the upper limit setting Nkug of the backup speed control which, at a first glance, appears to be of no connection. Thus, as shown in FIG. 4, in the generation mode, the setting Nkug of the backup speed control at the upper limit of the normal operation range is set around the upper limit Naug of the normal operation range to suppress the temporarily rise of the rotating speed N.

As seen from the above, when the difference between the upper limit Naup of the normal operation range in the pumping up mode and the upper limit Naug of the normal operation range in the generation mode is large, it is not appropriate to share the upper limit setting Nkug of the backup speed control in the generation mode with the upper limit setting Nkup of the backup speed control in the pumping up mode.

At the lower limit end, as shown in FIG. 2, the lower limit setting Nklg of the backup speed control in the generation mode may be set to be equal to the lower limit setting Nklp of the backup speed control in the pumping up mode.

In accordance with the present invention, the backup speed control in the generation mode is effected such that the lower limit setting is set in accordance with the rotation vibration continuously generated during the operation in the generation mode and the upper limit setting is set optimally in consideration of the overrun which accompanies with the swing-back of the overshoot of the rotating speed. Thus, the stable and continuous operation is attained without departing from the predetermined adjustable speed range.

The backup speed control may be readily incorporated as a portion of software of the control unit.

What is claimed is:

1. An adjustable speed pumping-up generator including an induction generator motor having,
   - a stator with a primary winding connected to a power system;
   - a rotor with a secondary winding connected to a pump turbine having guide vanes and means for adjusting said guide vanes;
   - an AC exciting unit for adjustable frequency excitation of said secondary winding; and
   - said rotor having a rotary shaft which is driven, in a generation mode, by said pump turbine which, in a pumping up mode, drives said pump turbine in the pumping up mode, said adjustable speed pumping-up generator comprising:
   - a first speed control means receiving an external power command signal to be engaged in the generation mode for adjusting speed of said pump turbine to an optimum value in accordance with said external power command signal by adjusting said guide vane means of said pump turbine;
   - a back-up speed control means operating when the speed of said pump turbine is determined to be out of a predetermined operable range while said first speed control means is operating for returning the speed of said pump turbine to said predetermined operable range by controlling said AC exciting unit;
   wherein said first speed control means and said back-up speed control means are set so that a decreasing speed limit setting that causes said operating of said back-up speed control means is set to be less than a minimum setting of said first speed control means by an amount larger than a single amplitude of sustained speed oscillations achievable under control of said first speed control means.

2. A variable speed pumping up generator according to claim 1, wherein said second speed control means, in the generation mode, controls the amount of AC excitation from said AC exciting unit when the rotating speed of said rotary shaft rises above an upper limit setting, and the upper limit setting is higher than the upper limit of the normal operation range in the generation mode and below the upper limit of the normal operation range in the pumping up mode.

3. A variable speed pumping up generator according to claim 1, wherein said first speed control means outputs, in the pumping up mode, a speed control command or a power control command for controlling said AC exciting unit.

4. A variable speed pumping up generator according to claim 1, wherein the lower limit of the normal rotating speed in the generation mode is set to be higher than the lower limit of the normal rotating speed in the pumping up mode.

5. A variable speed pumping up generator according to claim 1, wherein a single amplitude of the rotation speed vibration is within 0.15% of the rotating speed of the rotary shaft which can be assumed during the normal operation.

* * * * *